United States Patent [19]

Schots

[11] 4,026,316
[45] May 31, 1977

[54] VALVE MECHANISM
[75] Inventor: Klaas Schots, Tilburg, Netherlands
[73] Assignee: Hopfma Anstalt, Schaan, Liechtenstein
[22] Filed: Mar. 26, 1974
[21] Appl. No.: 454,822
[52] U.S. Cl. .............................. 137/212; 222/400.7
[51] Int. Cl.² ................... F16L 37/28; B65D 83/14
[58] Field of Search ................ 137/212; 222/400.7
[56] References Cited
FOREIGN PATENTS OR APPLICATIONS
1,239,907   7/1971   United Kingdom ............... 137/212

*Primary Examiner*—Alan Cohan
*Attorney, Agent, or Firm*—Pravel, Wilson & Gambrell

[57] ABSTRACT

This invention relates to a valve mechanism for draining a liquid from a vessel by means of pressurized gas introduced into the vessel, said mechanism comprising a connecting member mounted on the vessel, having a hollow rising pipe extending to near the bottom of the vessel and being open at the lower end and a closing member located near the top side and urged by a spring mechanism into a closed state and a connecting piece adapted to be coupled with the connecting member and having a gland with the aid of which the closing member can be opened against the action of the spring mechanism for passing pressurized gas through the connecting piece and the connecting member to the vessel and for passing liquid from the vessel through the connecting piece, for which purpose the connecting piece is provided with a gas supply duct and a liquid outlet duct.

7 Claims, 5 Drawing Figures

VALVE MECHANISM

In known valve mechanisms of the kind set forth the connecting piece is frequently provided with mechanically operating members for urging the closing member into the open state after the connecting piece is arranged on the connecting member. Such a construction renders the valve mechanism complicated and often gives rise to faulty actuation in mounting and dismounting the connecting piece, which may result in damage of the valve mechansim.

The invention has for its object to provide a valve mechanism of the kind set forth, whose construction is simple and which substantially precludes errors in coupling and discoupling the connecting piece or in which an error cannot result in damage of the mechanism.

According to the invention this can be achieved by providing the connecting piece with a chamber accommodating an adjusting member connected with the gland and adapted to be displaced in the chamber under the action of pressurized gas flowing through the supply connection into the chamber so that by moving along the gland said adjustable member opens the closing member. Opening of the closing member does, therefore, not require special operations, since as soon as the pressurized gas is admitted for expelling the liquid from the vessel the closing member is automatically opened.

According to a further aspect of the invention the connecting piece of the valve mechanism can be simply constructed so that it may be employed with different types of connecting members since two relatively concentric glands are provided, each of which is coupled with an adjusting member.

The invention will now be described more fully with reference to a few embodiments of the construction in accordance with the invention shown in the accompanying drawings.

FIG. 4 is a sectional view of a third embodiment.

Figure 1:
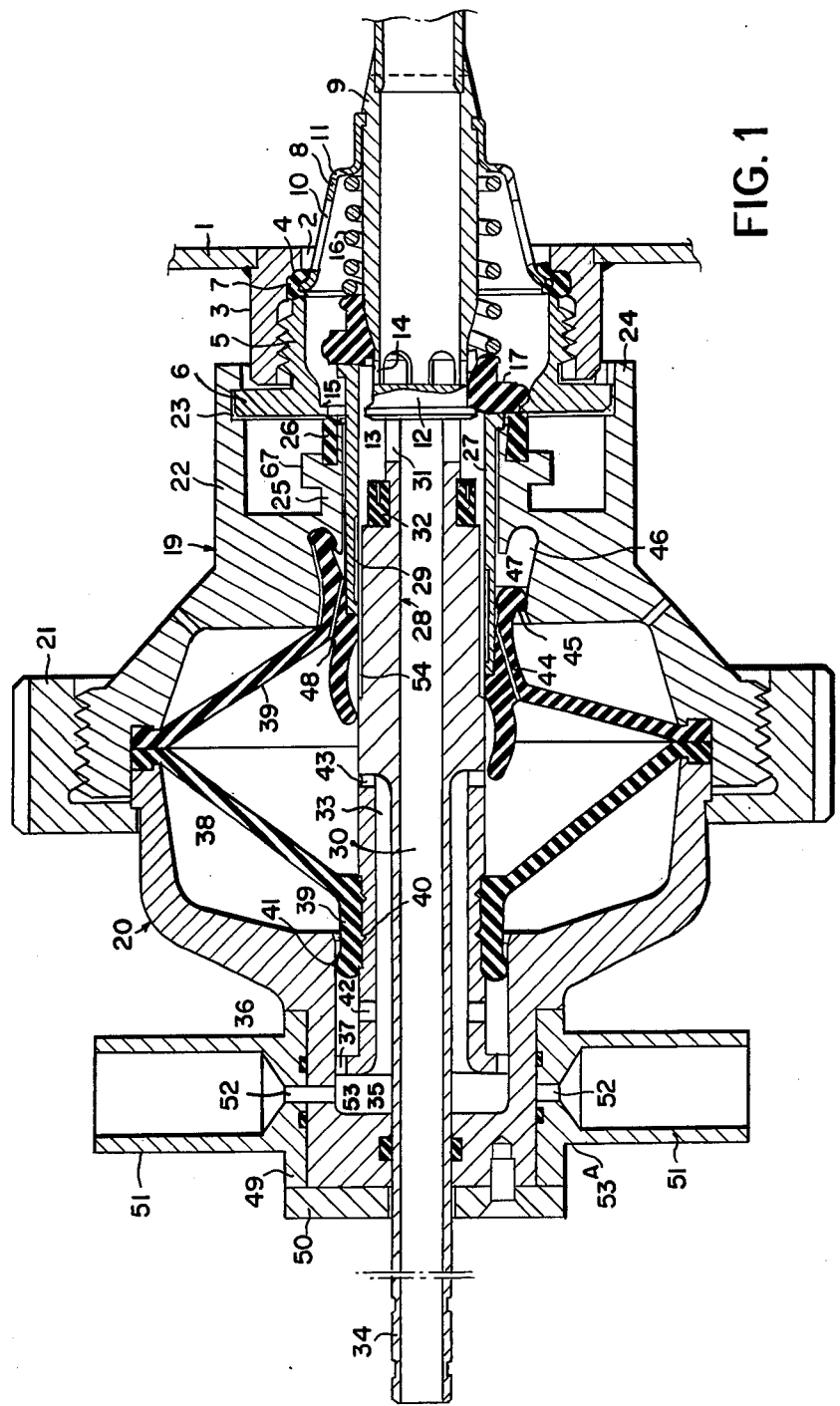
FIG. 1 is a sectional view of a first embodiment of a valve mechanism in accordance with the invention.

FIG. 1 shows part of a vessel 1 in which an opening 2 is provided with a collar 3 fastened to the vessel and extending upwards away from the wall of the vessel, said collar having an inner screwthread. By providing a difference in the inner diameter of the collar 3 a shoulder 4 is formed near the lower side of the collar 3.

The connecting member arranged in the vessel comprises a nut 5 screwed into the collar 3 and having a circular flange 6 having three flat sides (not shown) regularly distributed along the circumference.

With the aid of the nut 5 is clamped an outwardly bent-over rim of a conical socket 8, which rim is surrounded by a packing piece 7. The lower end of the socket 8 is cylindrical and by means of a flanged rim locks onto a groove provided in a rising pipe 9 so that the rising pipe is fixedly secured to the socket 8. A plurality of holes 10 and 11 is provided in the socket 8.

The top end of the rising pipe is closed by means of a plug 12 provided with a rim 13 forming a projecting shoulder. Beneath the plug 12 the wall of the rising pipe has apertures 14. The rising pipe 9 with the plug 12 is arranged so that the shoulder 13 is located approximately at the same level as a shoulder formed by an inwardly projecting rim 15 on the top side of the flange 6 of the nut 5.

The upper part of the rising pipe is surrounded by a compression spring 16, the lower end of which bears on the socket 8, as is shown in FIG. 1, whereas a cup spring 17 bears on the top end of the compression spring 16. The cup spring 17 together with a ring 18 of rubber or similar elastic material bearing on said cup spring constitutes a closing member, which in the position shown in the left-hand part of FIG. 1 engages the two shoulders 13 and 15 and thus shuts the interior of the vessel from the open air.

The connecting piece mounted on the connecting member comprises a housing having a lower portion 19 and an upper portion 20, which are clamped together with the aid of a clamping nut 21.

In order to permit mounting of the connecting piece on the connecting member shown in FIG. 1 the lower portion 19 of the housing is provided with an apron 22 hanging down and having a annular chamber 23 so that on the lower side of the apron 22 a rim 24 is formed. The rim 24 is constructed so that in a first position of the connecting piece with respect to the connecting member the connecting piece can be moved into a position such that the flange 24 extends beyond the flange 6, after which, by turning the connecting piece, the flange 24 grips those parts of the flange 6 which are located between the flat sides of the flange 6 so that the connecting piece can no longer move in an axial direction with respect to the connecting member.

The apron 22 surrounds and is concentric with a hub 25, carrying a packing 26, which is pressed against the rim 15, as is shown in FIG. 1.

In the connecting piece are located two relatively concentric glands 27 and 28. The sleeve-like gland 27 surrounds the gland 28 and is provided on its lower side with a rim bearing on the stuffing ring 18. Near the top side of the gland 27 the inner wall of the gland has a circular recess 29.

The gland 28 has a bore 30 extending in the direction of the length of the gland and communication through holes 31 in the lower end of the gland which bears on the plug 12 with the space between the inner wall of the sleeve 27 and the thinner end of the gland 28. It will be apparent that the thinner lower end of the gland is surrounded by a packing ring 32.

In the upper portion of the gland an annular chamber 33 is provided so that the upper portion of the gland forms a thin-walled tube 34 bounding the passage 30 and projecting out of the housing and forming an outlet for liquid. The portion of the gland which forms the outer boundary of the chamber 33 is provided on the top side with a bent-over rim 35, which constitutes a guide for the gland in a cylindrical chamber 36 provided in the upper portion 20.

In the ring 35 apertures 37 are provided for establishing communication between the portions of the chamber 36 located above and beneath the ring.

From the FIG. 1 it will furthermore be apparent that between the lower portion 19 and the upper portion 20 of the housing are clamped the edges of two conical membranes 38 and 39. The membrane 38 is inclined upwardly away from its clamping area and is provided at the top with a collar 38A surrounding the gland 28.

not urged upwards to an extent such that it is located in the chamber 36.

When pressurized gas is admitted, this gas will exert its force on the whole surface of the membrane 38 so that this membrane with the gland 28 is urged downwards. Initially only the valve 62 will be moved along until the packing 32 arrives in an annular recess after which, with the further downward movement of the gland 28, this sleeve-like body 58 with the rising pipe 57 is also urged down, the packing 59 being thus released from its seat.

The pressurized gas can then flow via the chamber 33, the bores 43, the grooves 54, the recesses 29, along the packing 59 and via the openings 56 into the top of the vessel. The liquid thus pressurized can rise up through the rising pipe 57 along the opened valve 61 through the openings 31 and via the passage 39 to a tap or the like.

Figure 2:
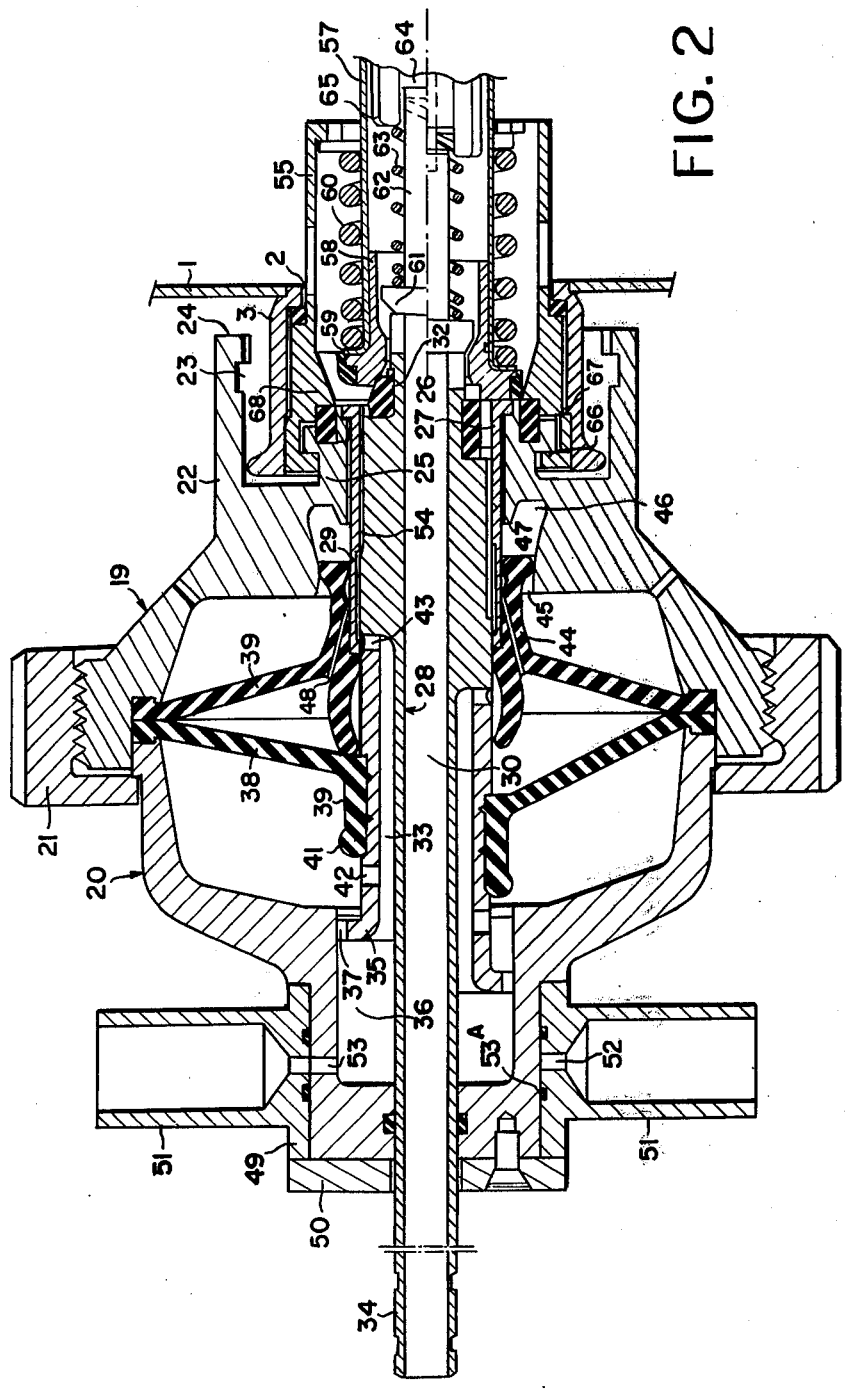
FIG. 2 shows a valve mechanism in accordance with the invention, in which the connecting piece is identical to the connecting piece of the first embodiment, whereas the connecting member fastened to the vessel is differently constructed.
Figure 3:
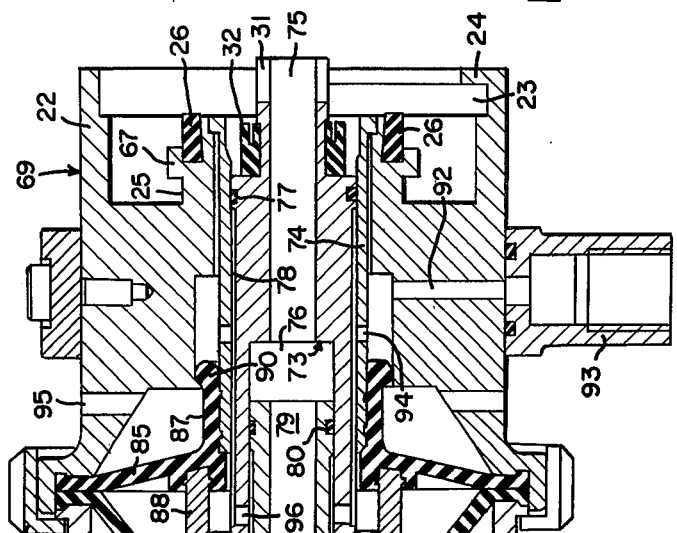
FIG. 3 is a sectional view of a second embodiment of a connecting piece in accordance with the invention.

FIG. 3 shos a connecting piece comprising a housing formed by a lower portion 69 and an upper portion 70, these two portions being clamped together by means of a clamping nut 72. This connecting piece, like the connecting piece described with reference to FIG. 1, can be coupled with the two connecting members shown in FIG. 1 and 2, for which purpose the lower portion of the housing is provided with a suspending apron 22 having a projecting rim 24 and a hub 25 with a packing 26 and lugs 67.

Also in this case the connecting piece comprises two relatively concentric glands 73 and 74, the sleeve-like gland 74 surrounding the gland 73, like the gland 27 of the first embodiment, being provided on its lower side with a rim intended for a co-operation with the stuffing ring 18. The gland 73 is provided on the lower side with a bore 75, extending in its direction of length and terminating approximately midway in a bore 76 of larger diameter. The thinner end of the gland 73, like the thinner end of the gland 28, is provided with a packing 32 and openings 31. In the portion of the gland 73 located above the packing 32 a groove is provided for receiving an O-ring 77, which establishes a seal between the part of the gland 73 and the internal circumference of the sleeve-like gland 74. In the outer circumference of the portion of the gland 73 located above the ring 77 grooves 78 are provided in the direction of length of said gland.

The bore 76 of the gland 73 comprises a sleeve 79, which is provided near its lower end with a groove accommodating an O-ring 80 for establishing a seal between the wall of the bore 76 and the outer circumference of the sleeve 79. The top end of the sleeve 79 is fixed in the top part 70 and the bore of the sleeve communicates with a passage 81 in the portion 70 of the housing, with which passage a nipple 82 is connected for conducting the liquid away.

In the outer circumference of the sleeve, above the packing 80 grooves 83 extend in the longitudinal direction of the sleeve.

The connecting piece shown in this Figure is also provided with two membranes 84 and 85, the outer edges of which are clamped between the portion 69 of the housing and the portion 70 thereof. The upper membrane 84 extends away from the clamping area in the housing obliquely upwards and is provided with a socket 86 surrounding the top end of the gland 73 and provided with ridges located in grooves provided in the gland. The membrane 85 is slightly inclined downwards away from its clamping area and is provided with a socket 87 surrounding the top end of the gland 74. The membrane 85 also has fastened to it an upwardly extending sleeve 38, which surrounds concentrically the two glands and in which is journalled in the position shown in the Figure a collar 89 integral with the lower end of the socket 86, said collar being in contact with the outer circumference of the gland 73 and the inner circumference of the sleeve 88.

The lower end of the socket 87 is provided with a collar 90, which engages the wall of a chamber 91 recessed in the lower portion 69 of the housing. The chamber 91 communicates through a bore provided in the lower portion 69 of the housing with a connection piece 93, through which pressurized gas can be supplied. The gland 74 is provided with a number of bores 94, which establish a communication between the chamber and the grooves 78. The space located beneath the membrane 85 communicates through a bore 95 in the portion 69 of the housing with the atmosphere.

When the connecting piece described above with reference to FIG. 3 is coupled with the connecting member shown in FIG. 1, the lower end of the gland 73 will bear on the plug 12 and be urged upwards by the plug 12 so that the collar 89 is located above the lower end of the sleeve 88. The lower edge of the gland 74 will bear on the ring 18. When pressurized gas is admitted through the connecting piece 93, it will flow via the chamber 91 and the bores 94 and the space between the membranes 84 and 85, the membrane 85 with the gland 74 coupled herewith being urged downwards so that the closing member 17, 18 of the embodiment shown in FIG. 1 will be opened. The pressurized gas can then flow through the annular gap between the outer circumference of the gland 74 and the inner circumference of the hub 25 into the vessel as is described with reference to FIG. 1, whilst the liquid, for example, beer, contained in the vessel can flow through the rising pipe 9, the openings 14, the openings 31, the passages 75 and 76 in the gland 73, the bore of the sleeve 79 and the bore 81 in the connecting piece 82 to a tap or the like.

When the connecting piece described with reference to FIG. 3 is mounted on the connecting member shown in FIG. 2, the admitted pressurized gas will flow via the bore 92, the chmber 91, the bores 94, the elongate holes 78 directly beneath the collar 89 and he bores 96 in the gland 73 and the grooves 83 into the space above the membrane 84.

The membrane 84 with the gland 73 will thus be urged downwards by the pressurized gas and thus open the closing member in the manner described with reference to FIG. 2. In this opened state the lower end of the gland 73 holding the O-ring 77 is located in a portion of the gland 74, which has the larger inner diameter, so that the pressurized gas can flow via the grooves 78 and along the outer circumference of the O-ring 77 into the vessel, the liquid contained in said vessel being conducted out in the manner described with reference to FIG. 2 via the connecting member and through the interior of the gland 73.

The connecting piece shown in FIG. 4 comprises a housing composed of a lower portion 97 and an upper portion 98, which are interconnected in a similar manner as the lower potion of the housing of the preceding embodiments and in this embodiment it is fastened to the connecting member shown in FIG. 1. This connecting piece, like that described for the preceding embodiments, can be mounted on both connecting members shown in FIGS. 1 and 2 and for this purpose also the lower portion of the housing is provided with a depending apron 22 having a rim 24 and a hub 25 with a packing 26 and lugs 67. This connecting piece also comprises two relatively concentrical glands 99 and 100, the sleeve-like gland 100 surrounding the gland 99 being provided, like the gland 27 of the first embodiment and the gland 74 of the second embodiment, with a rim intended for a co-operation with the stuffing ring 18. The gland 99 is provided on the lower side with a bore 101 extending in the longitudinal direction of the gland 99 and terminating approximately midway between the gland in a bore 102 of larger diameter. The lower end of the gland 99, like the lower ends of the two interior glands of the preceding embodiment, is provided with a packing 32 and openings 31.

The bore 76 of the gland 99 comprises a pipe 103, which exends outwardly through the wall of the upper portion 98 of the housing and is provided with a connection 104 for the delivery of liquid.

The connecting piece shown in this Figure also comprises two membranes 104 and 105 A, the outer edges of which are clamped tight between the portions 97 and 98 of the housing. In the neutral state shown in FIG. 4 the membrane 104 extends from its clamping area between the two portions 97 and 98 of the housing in a downwardly inclined position and is provided with a thickened inner rim 105 in which a metal plate 106 is arranged for stiffening purposes. In the top end of the outermost gland 100 is arranged a groove receiving part of the rim 105 as is shown in FIG. 4, so that the membrane 104 is coupled with the outermost gland. To the outer circumference of the thickened rim 105 is joined a downwardly extending, thin apron 107, which engages, in the no-load state, a wall portion of the portion 97 of the housing, which forms a boundary of the chamber in the connecting piece located beneath the membrane 104.

In the thickened rim portion 105 and in the plate 106 bores 108 are provided, which communicate through slits 109 in the lower part of the rim portion with the space enclosed by the apron 107.

The upper membrane 105A is inclined upwards away from the clamped area between the two portions of the housing and comprises furthermore a thickened inner portion 104A, which is stiffened by an embedded metal plate 110. This thickened portion 104 with the plate 110 is secured by screws 111 to the top end of the inner gland 99. This thickened portion 104A has bores 112, extending also through the plate 110 nd communicating through cuts 113 with a space between the membranes 104 and 105A and bounded by the outer circumference of the gland 99 and a thin apron 114 extending from the outer circumference of the thickened inner rim 105 of the lower membrane in an upward direction, the free upper edge of the apron engaging the lower side of the thickened portion 104A of the upper membrane 105A.

On the upper portion 98 of the housing is arranged a connecting member 115 for connecting a supply vessel of pressurized gas, for example, a $CO_2$ cylinder.

When the connecting piece shown in FIG. 4 is coupled with the connecting member shown in FIG. 1, the gland 99 will bear by its lower end on the top surface of the plug 12 so that this gland cannot move downwards. When, via the connection 115, pressurized gs is admitted, it will flow via the bores 112 and the cuts 113 into the space between the membranes 104 and 105A and since the apron 114 will not be firmly pressed against the lower side of the upper membrane 105A, it will act upon the whole surface of the membrane 104. Owing to the action of the pressurized gas the membrane 104 is urged downwards, whilst the apron 107 can readily fold up, so that it will not counteract such a movement of the membrane 104.

The pressurized gas flows furthermore via the bore 108 and the cuts 109 and the gap between the outer circumference of the gland 100 and the inner wall of the hub 25 into the vessel with which the connecting piece is connected, so that the liquid contained in said vessel is exposed to pressure and can be conducted away via the bores 101 and 102 in the manner described with reference to FIG. 2.

The connecting piece shown in FIG. 4 may furthermore be mounted on the connecting member shown in FIG. 2. When pressurized gas is admitted, the inner gland 99 will be urged downwards by means of the membrane 105A to open the closing member via the bores 112, the cuts 113, the bores 108, the cuts 109 and the gap between the outer circumference of the outmost gland 100 and the inner circumference of the hub. Pressurized gas will be supplied to the interior of the vessel so that the liquid thus exposed to pressure can escape through the bores 101 and 102.

Figure 5:
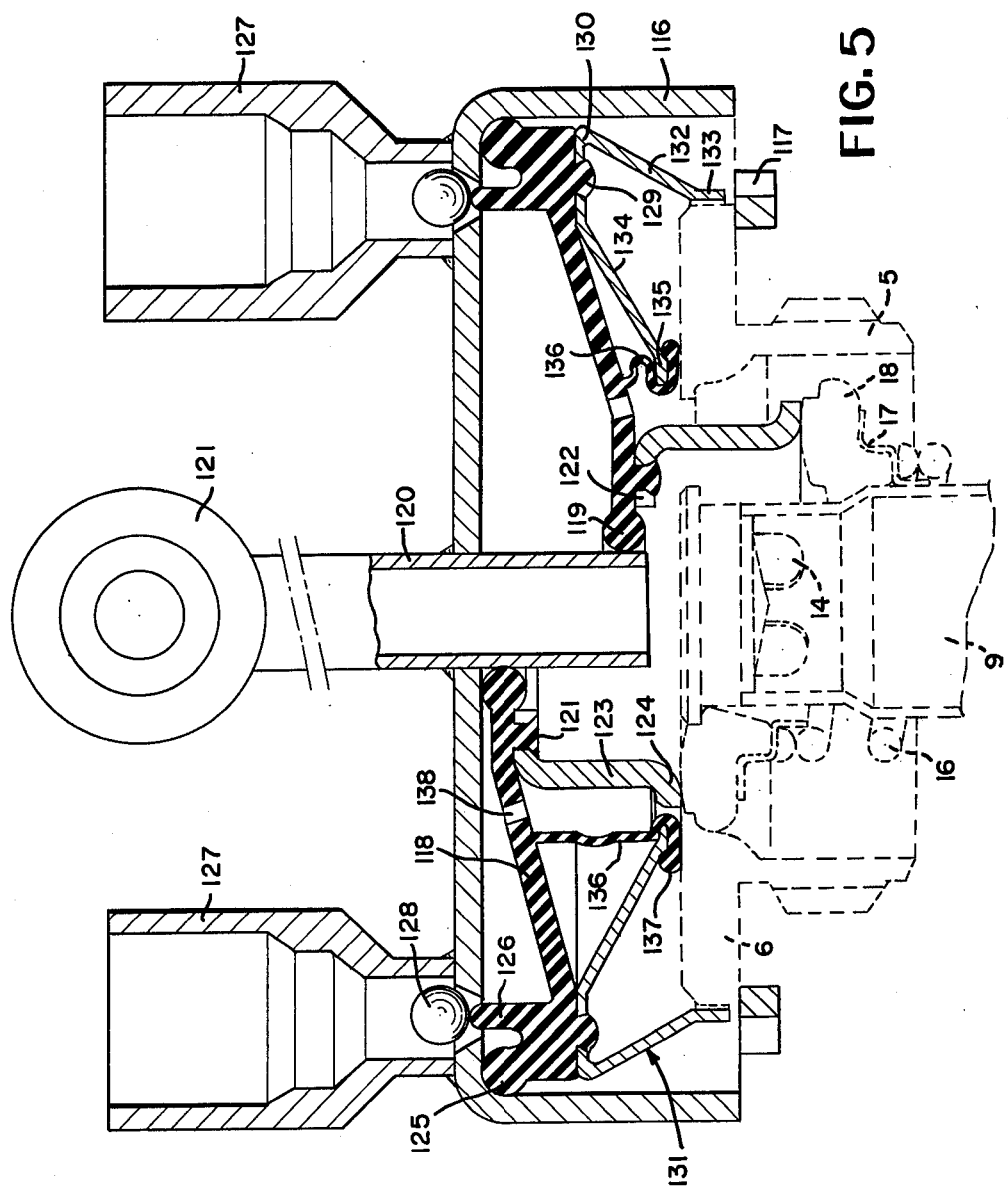
FIG. 5 is a sectional view of a fourth embodiment.

FIG. 5 shows an embodiment of a connecting piece which is suitable for being coupled with the connecting member shown in FIG. 1. In the left-hand part of the Figure is shown the closed state of the closing member and in the right-hand part the opened state of the closing member.

From this Figure it will be seen that the connecting piece comprises a housing 116 having inwardly bent rim portions 117 for coupling with the flange 6 of the connecting member.

The housing has a U-shaped section and encloses a chamber which accommodates a membrane 118. At the center the membrane has a passage bounded by a thickened collar 119, which engages the outer circumference of a pipe 120 taken through the wall of the housing 116 said pipe being open at the lower end and being provided at the top with connecting piece 121 through which liquid or the like can be conducted away. Near the collar 119 the membrane is provided with extensions 121 located in bores in an inwardly bent-over flange 122 of a sleeve-like gland 123, which is concentric with the pipe 120 and whose outwardly bent-over rim 124 bears on the ring 18, when the connecting piece is coupled with the connecting member in the manner illustrated in FIG. 5.

In the no-load state of the membrane shown in the left-hand part of the Figure the part of the membrane joining the gland 123 is inclined downwards, whilst at the outer circumference the membrane is provided with a thickened part having a collar 125, which engages the corner between the horizontal portion and the vertical portion of the housing 116 concentrical to the pipe 120. At a comparatively short distance from the collar 125 the thickened part of the membrane comprises an upwardly extending, circulr collar 126. When the connecting piece is mounted on the connecting member with the aid of the inwardly bent rim portions 117 the membrane 118 is urged upwards so that the collar 125 engages the corner in the wall of the housing 116 and the collar is urged against the wall and deformed so that part of the collar 126 gets into a conical opening in the horizontal upper wall of the housing 116, which opening is surrounded by the lower end of he connecting piece 127, through which pressurized gas or the like can be supplied. The part of the collar 126 extending upwards in the opening is cooperating with a ball 128 in the part 127.

The thickened part at the outer circumference of the membrane 118 has furthermore angular parts 129 projecting downwards and located in holes provided in a horizonal, annular part 130 of a supporting member 131. The outer circumference of the annular part 130 of the supporting member 131 is joined by an apron 132 extending downwards and inwards within the housing 116, said apron terminating in an annulr part 133 fitting around the flange 6. The inner edge of the annular part 130 is joined by a downwardly inclined rigid apron portion 134, extending in the direction of the center line of the housing 116 and terminating at its lower edge in an inwardly diected, horizonal flange 135.

At a comparatively short distance from the gland 123, on the lower side of the membrane a depending apron 136 is integral with the membrane and surrounds the gland 123, the lower side of said apron being provided with a channel-section part 137 in which the flange 135 is held.

The membrane 118 has bores 138 establishing a communication between the space above the membrane and the space between the outer circumference of the gland 123 and the inner circumference of the flexible apron 136. From the Figures it will be apparent that between the outer circumference of the bent-over rim 124 of the gland 123 and the inner circumference of the channel-section part 137 of the flexible apron 136 a gap is provided.

When the gland described above is connected with a connecting member, the various part of the connecting piece, when no pressurized gas is supplied, will occupy the position shown in the left-hand part of the Figure. However, when pressurized gas is supplied through the connection 127, the membrane is urged by the gas towards the position shown in the right-hand part of the Figure, so that the closing member 17, 18 is pushed into the open state. Then pressurized gas can flow through the bores 138 and the space between the gland 123 and the flexible apron 136 into the vessel so that the liquid contained in the vessel is exposed to presure and can flow via the rising pipe 9 and the tube 120 in the manner described with reference to FIG. 1.

It will be obvious that such a connecting piece, which can be mounted on only one connecting member, may also be manufactured for mounting on the connecing member shown in FIG. 2.

If the pressure of the supplied gas is excessively high the finger 126 can be deformed by the ball 128 so that the ball drops on its seat and a closure is obtained.

When the connecting piece is unscrewed, the membrane 118 will slightly sink down so that the collars 125 and 126 are released from the inner wall and the ball 128 drops on its seat so that the supply of pressurized gas is automatically cut off and any gas still present above the membrane can escape.

What we claim is:

1. A valve mechanism for connection with a connecting member on a vessel for draining liquid from the vessel with a pressurized gas through pipe means and vessel closing means in the connecting member, the vessel closing means having a closed position blocking entry of gas into the vessel and flow of liquid from the vessel and an open position permitting entry of gas into the vessel and the flow of liquid from the vessel, comprising:
   a. a connecting piece having means therewith for mounting with the connecting member, said connecting piece further having a chamber therein for receiving the pressurized gas;
   b. supply means for providing the pressurized gas to said connecting piece;
   c. outlet means for conveying the liquid from the connecting piece;
   d. first movable gland means mounted in said connecting piece for engaging the vessel closing means externally of the pipe means in the vessel for moving the vessel closing means into the open position;
   e. second movable gland means extending through said chamber in said connecting piece to said supply means, having means therewith for passing liquid from the closing means to said outlet means, and further having means therewith for conveying the pressurized gas to the enclosed space in said chamber;
   f. a first movable adjusting member mounted in said chamber of said connecting piece and connected to said first gland means, said first movable adjusting member moving in response to the pressurized gas from said supply means to thereby cause said first movable gland means to move the vessel closing means into the open position and thereby permit the liquid to be drained from the vessel; and
   g. a second movable adjusting member coupled to said second gland means for forming a seal between said second gland means and said connecting piece.

2. The valve mechanism as set forth in claim 1, wherein:
said first movable adjusting member comprises a membrane.

3. The valve mechanism set forth in claim 1, wherein:
said second movable adjusting member is located above said first movable adjusting member in said chamber in said connecting piece.

4. The valve mechanism set forth in claim 1, wherein:
said second movable adjusting member comprises a membrane.

5. The valve mechanism set forth in claim 1, wherein:
said second gland has a bore formed therethrough for passing liquid from the vessel closing means to said outlet means.

6. The valve mechanism set forth in claim 5, wherein:
a. the outer circumference of said second gland and the inner circumference of said first gland defines a pocket adjacent to the vessel closing means; and
b. a plurality of passages are formed in said second gland adjacent said pocket for establishing a communication for the flow of the liquid from the said pocket to said bore in said second gland.

7. The valve mechanism as set forth in claim 6, further including:
a packing ring mounted with said second gland for sealing said liquid passages from said chamber.

* * * * *

UNITED STATES PATENT OFFICE
CERTIFICATE OF CORRECTION

Patent No. 4,026,316      Dated May 31, 1977

Inventor(s) Klaas Schots

It is certified that error appears in the above-identified patent and that said Letters Patent are hereby corrected as shown below:

The term of this patent subsequent to

May 31, 1992, has been disclaimed.

*Signed and Sealed this*

*Sixth* Day of *September 1977*

[SEAL]

Attest:

RUTH C. MASON
*Attesting Officer*

LUTRELLE F. PARKER
*Acting Commissioner of Patents and Trademarks*

UNITED STATES PATENT OFFICE
CERTIFICATE OF CORRECTION

Patent No. 4,026,316          Dated May 31, 1977

Inventor(s) Klaas Schots

It is certified that error appears in the above-identified patent and that said Letters Patent are hereby corrected as shown below:

The term of this patent subsequent to

May 31, 1992, has been disclaimed.

*Signed and Sealed this*

*Sixth* Day of *September 1977*

[SEAL]

Attest:

RUTH C. MASON  
*Attesting Officer*

LUTRELLE F. PARKER  
*Acting Commissioner of Patents and Trademarks*